(12) United States Patent
Guo et al.

(10) Patent No.: US 10,178,454 B2
(45) Date of Patent: Jan. 8, 2019

(54) MOTOR MATRIX CONTROL METHOD AND WEARABLE APPARATUS

(71) Applicant: Beijing Pico Technology Co., Ltd., Hai Dian District (CN)

(72) Inventors: Hengjiang Guo, Hai Dian District (CN); Hongwei Zhou, Hai Dian District (CN); Yucai Han, Hai Dian District (CN)

(73) Assignee: Beijing Pico Technology Co., Ltd., Hai Dian District (CN)

( * ) Notice: Subject to any disclaimer, the term of this patent is extended or adjusted under 35 U.S.C. 154(b) by 348 days.

(21) Appl. No.: 15/221,378

(22) Filed: Jul. 27, 2016

(65) Prior Publication Data

US 2017/0195759 A1 Jul. 6, 2017

(30) Foreign Application Priority Data

Jan. 5, 2016 (CN) .......................... 2016 1 0006963

(51) Int. Cl.
*G06F 17/00* (2006.01)
*H04R 5/02* (2006.01)
(Continued)

(52) U.S. Cl.
CPC ............. *H04R 1/02* (2013.01); *A42B 3/0406* (2013.01); *G06F 3/016* (2013.01); *H04R 3/00* (2013.01);
(Continued)

(58) Field of Classification Search
CPC .. G06F 17/3074; G06F 17/30743; G06F 3/16; H04R 1/02; H04R 3/00; H04R 2400/03; H04R 2460/13; H04S 2400/15
(Continued)

(56) References Cited

U.S. PATENT DOCUMENTS 5,850,455 A * 12/1998 Arnold ...................... H04S 3/00
381/17
5,943,427 A * 8/1999 Massie ...................... H04S 1/007
381/1
(Continued)

FOREIGN PATENT DOCUMENTS

| CN | 101697470 A | 4/2010 |
| CN | 103003775 A | 3/2013 |
| CN | 104857704 A | 8/2015 |

OTHER PUBLICATIONS

Chinese Patent Office, First Office Action of CN 201610006963.1, dated Feb. 27, 2017.

*Primary Examiner* — Xu Mei
(74) *Attorney, Agent, or Firm* — LKGlobal | Lorenz & Kopf, LLP

(57) ABSTRACT

A method includes, but is not limited to, arranging several linear motors based on a 3D spherical model to form a linear motor matrix, and determining an azimuth of each linear motor on the 3D spherical model, performing information extraction for received 3D audio signal, and obtaining azimuth, frequency and amplitude information of the 3D audio signal reaching a central position of the 3D spherical model, generating a motor drive signal according to the azimuth, frequency and amplitude information of the 3D audio signal reaching a central position of the 3D spherical model, and driving a linear motor in the linear motor matrix within a certain scope away from the azimuth of the 3D audio signal to vibrate.

10 Claims, 2 Drawing Sheets

(51) Int. Cl.
  *H04R 1/02*    (2006.01)
  *A42B 3/04*    (2006.01)
  *G06F 3/01*    (2006.01)
  *H04R 3/00*    (2006.01)
  *G06F 17/30*   (2006.01)
  *H02P 25/06*   (2016.01)

(52) U.S. Cl.
  CPC ........ *G06F 17/30743* (2013.01); *H02P 25/06* (2013.01); *H04R 2400/03* (2013.01); *H04R 2460/13* (2013.01); *H04S 2400/15* (2013.01)

(58) Field of Classification Search
  USPC .................. 700/94; 381/61, 307, 309, 310
  See application file for complete search history.

(56) References Cited

U.S. PATENT DOCUMENTS

| | | | |
|---|---|---|---|
| 7,190,794 B2* | 3/2007 | Hinde | G11B 19/025 381/17 |
| 7,266,207 B2* | 9/2007 | Wilcock | G06F 3/167 381/17 |
| 7,563,168 B2* | 7/2009 | Jahnke | A63F 13/10 463/35 |
| 9,105,103 B2* | 8/2015 | Holz | G06T 7/251 |
| 2005/0141723 A1* | 6/2005 | Lee | H04R 5/027 381/26 |
| 2009/0192707 A1* | 7/2009 | Nakatsuka | G01C 21/3629 701/431 |

* cited by examiner

MOTOR MATRIX CONTROL METHOD AND WEARABLE APPARATUS

CROSS-REFERENCE TO RELATED APPLICATIONS

This application claims priority to Chinese Application Number 201610006963.1 filed Jan. 5, 2016, which is incorporated herein by reference in its entirety.

TECHNICAL FIELD

The present invention relates to the technical field of virtual reality, and particularly to a motor matrix control method and a wearable apparatus.

BACKGROUND

As virtual reality technology develops, people pay more and more attention to all-round interaction type experience including visual sense, auditory sense and tactile sense. However, a solution in the prior art treats 2D or 3D sound and a tactile feedback in a separated and differentiated manner so that it is difficult to achieve highly uniform synchronization between the tactile feedback and 2D or 3D sound. As a result, a user cannot achieve high correspondence and harmony in visual, auditory and tactile aspects in virtual reality experience so that his virtual reality experience is affected.

In addition, other objects, desirable features and characteristics will become apparent from the subsequent summary and detailed description, and the appended claims, taken in conjunction with the accompanying drawings and this background.

SUMMARY

With respect to the above problem in the prior art that the sound and tactile feedback are treated in separated and differentiated manner so that they cannot achieve highly uniform synchronization, the present invention provides a motor matrix control method and a wearable apparatus to solve or at least partially solve the above problem.

In one aspect, the present invention provides a motor matrix control method, comprising:

arranging several linear motors based on a 3D spherical model to form a linear motor matrix, and determining an azimuth of each linear motor of the linear motor matrix on the 3D spherical model;

performing information extraction for received 3D audio signal, and obtaining azimuth, frequency and amplitude information of the 3D audio signal reaching a central position of the 3D spherical model;

generating a motor drive signal according to the azimuth, frequency and amplitude information of the 3D audio signal reaching a central position of the 3D spherical model, and driving a linear motor in the linear motor matrix within a certain scope away from the azimuth of the 3D audio signal to vibrate.

Optionally, the driving a linear motor in the linear motor matrix within a certain scope away from the azimuth of the 3D audio signal to vibrate comprises:

in an ascending order of a distance from the azimuth of the 3D audio signal, a voltage value of the drive signal gradually attenuates, and a frequency of the drive signal does not change until the voltage value of the drive signal is smaller than or equal to a minimum drive signal voltage value driving the linear motor to vibrate.

Optionally, an attenuation rate of the voltage value of the drive signal is determined according to the frequency information of the 3D audio signal.

Optionally, the linear motors are transversely-vibrating linear motors, and each linear motor has identical initial phase and resonance frequency;

the arranging several linear motors according to the 3D spherical model to form a linear motor matrix comprises:

placing the linear motors on the 3D spherical model in the directions of meridian and parallel so that all linear motors in the direction of meridian are arranged in the direction of meridian, all linear motors in the direction of parallel are arranged in the direction of parallel, and all linear motor devices in the same direction are oriented in the same direction.

Optionally, the azimuth of the 3D audio signal is represented by using Euler angle in Euler's Law, including a nutation angle $\theta$, a precession angle $w$ and a rotation angle $\varphi$.

In another aspect, the present invention provides a wearable apparatus, comprising:

a linear motor matrix consisting of several linear motors arranged on a 3D spherical model, azimuth of each linear motor of the linear motor matrix being determined based on the 3D spherical model;

an audio information extracting unit configured to perform information extraction for the received 3D audio signal, and obtain azimuth, frequency and amplitude information of the 3D audio signal reaching a central position of the 3D spherical model;

a drive signal generating unit configured to generate a motor drive signal according to the azimuth, frequency and amplitude information of the 3D audio signal reaching the central position of the 3D spherical model, and drive a linear motor in the linear motor matrix within a certain scope away from the azimuth of the 3D audio signal to vibrate.

Optionally, the drive signal generating unit is specifically configured in a way that in an ascending order of a distance from the azimuth of the 3D audio signal, a voltage value of the drive signal gradually attenuates, and a frequency of the drive signal does not change until the voltage value of the drive signal is smaller than or equal to a minimum drive signal voltage value driving the linear motor to vibrate.

Optionally, the drive signal generating unit is further configured to determine an attenuation rate of the voltage value of the drive signal according to the frequency information of the 3D audio signal.

Optionally, the linear motors of the linear motor matrix are transversely-vibrating linear motors, and each linear motor has identical initial phase and resonance frequency;

the linear motors are placed on the 3D spherical model in the directions of meridian and parallel so that all linear motors in the direction of meridian are arranged in the direction of meridian, all linear motors in the direction of parallel are arranged in the direction of parallel, and all linear motor devices in the same direction are oriented in the same direction.

Optionally, the azimuth of the 3D audio signal is represented by using Euler angle in Euler's Law, including a nutation angle $\theta$, a precession angle $\psi$ and a rotation angle $\varphi$.

As known from the above, by arranging several linear motors according to a 3D spherical model to form a linear motor matrix, performing information extraction for received 3D audio signal, obtaining azimuth, frequency and amplitude information of the 3D audio signal reaching a central position of the 3D spherical model, and generating a drive signal for driving the motor matrix according to the 3D audio signal to drive a motor at the corresponding azimuth in the motor matrix, the technical solutions of the present invention may input components of 3D sound into the 3D matrix motors for tactile feedback, and tactilely increase real sensory experience so that seamless matching of the sound and tactile feedback is achieved, and immersed type experience of virtual reality is enabled better.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Embodiments of the present invention will be described in more detail with reference to figures to make objects, technical solutions and advantages of the present invention more apparent.

Figure 1:
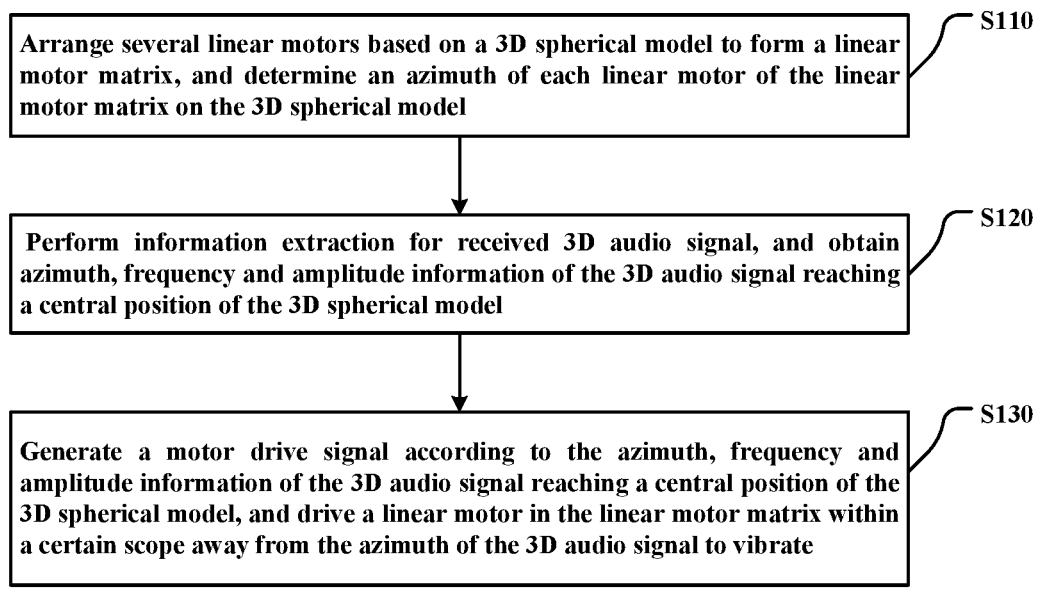
FIG. 1 is a flow chart illustrating a motor matrix control method according to an embodiment of the present invention.

FIG. 1 is a flow chart illustrating a motor matrix control method according to an embodiment of the present invention. As shown in FIG. 1, the method comprises:

Step S110: arranging several linear motors according to a 3D spherical model to form a linear motor matrix, and determining an azimuth of each linear motor of the linear motor matrix on the 3D spherical model.

Step S120: performing information extraction for received 3D audio signal, and obtaining azimuth, frequency and amplitude information of the 3D audio signal reaching a central position of the 3D spherical model.

Step 130: generating a motor drive signal according to the azimuth, frequency and amplitude information of the 3D audio signal reaching a central position of the 3D spherical model, and driving a linear motor in the linear motor matrix within a certain scope away from the azimuth of the 3D audio signal to vibrate.

By arranging several linear motors according to a 3D spherical model to form a linear motor matrix, performing information extraction for received 3D audio signal, obtaining azimuth, frequency and amplitude information of the 3D audio signal reaching a central position of the 3D spherical model, and generating a drive signal for driving the motor matrix according to the 3D audio signal to drive a motor at the corresponding azimuth in the motor matrix, the technical solution of the present invention may input components of 3D sound into the 3D matrix motors for tactile feedback, and tactilely increase real sensory experience so that seamless matching of the sound and tactile feedback is achieved, and immersed type experience of virtual reality is enabled better.

For example, 3D motor matrix is arranged on a virtual reality helmet; when the virtual reality helmet is employed to see a movie, the 3D audio signal transmitted by two earpieces represents scenarios through the 3D effect, and auditory experience presented to the user is that sound of firearms comes from rear of the user's brain. According to the present invention, linear motors within a certain scope of a corresponding azimuth in the rear of the helmet are controlled to vibrate to present human body tactile experience. As the linear motor responds at a high speed and its drive signal is determined according to the azimuth, frequency and amplitude information which comes from the audio signal and is extracted in real time, synchronization of visual, auditory and tactile sense may be achieved and a vivid virtual reality experience be presented to the user.

Preferably, the azimuth information of the 3D audio signal is extracted by using 3D virtual surround sound algorithm; frequency and amplitude information is extracted by using a method of obtaining various open sources, and vibration frequency and amplitude of the linear motor located at the center of the azimuth of the 3D audio signal are determined by using the frequency and amplitude information respectively.

In an embodiment of the present invention, the driving a linear motor in the linear motor matrix within a certain scope away from the azimuth of the 3D audio signal to vibrate in step S130 comprises:

In an ascending order of a distance from the azimuth of the 3D audio signal, a voltage value of the drive signal gradually attenuates, and a frequency of the drive signal does not change until the voltage value of the drive signal is smaller than or equal to a minimum drive signal voltage value driving the linear motor to vibrate.

The azimuth center is determined according to the extracted azimuth information of the 3D audio signal, vibration of the linear motors in the motor matrix is controlled to weaken gradually from the center to around, e.g., a numerical value in a range of 0 to 1 is used as an attenuation coefficient to reduce a vibration strength of the linear motors, and meanwhile the vibration frequency of the linear motors is ensured invariable, i.e., the frequency between the driven linear motors remains consistent. In this way, real sound spread characteristics may be simulated on the one hand, i.e., people usually judge that sound comes from a scope, and on the other hand, stepped feeling of vibration may be enhanced so that the tactile sense gets stronger as the distance from the azimuth gets shorter, and gets weaker as the distance from the azimuth gets longer, and thereby the user's tactile feeling is improved.

In an embodiment of the present invention, an attenuation rate of the voltage value of the drive signal is determined according to the frequency information of the 3D audio signal.

People have different feeling for sound signals of different frequencies. In the present invention, the vibration frequency of the linear motor is determined through the frequency of the sound signal to enable the tactile sense to reflect an effect that people have different feeling to sound of different frequencies; in addition to this, intensity and attenuation rate of the vibration of the motor are determined through a magnitude of frequency of the 3D audio signal to better simulate people's different feeling for high and low sound frequencies. For example, a vibration attenuation rate of the motor is controlled to fall as the audio frequency rises so that the vibration attenuation gets slower as the audio frequency rises. That is to say, in this situation, as the audio frequency rises, more motors can vibrate, and vibrate more intensely, thereby enhancing people's nervous feeling caused by high-frequency sound and improving real experience.

Figure 2:
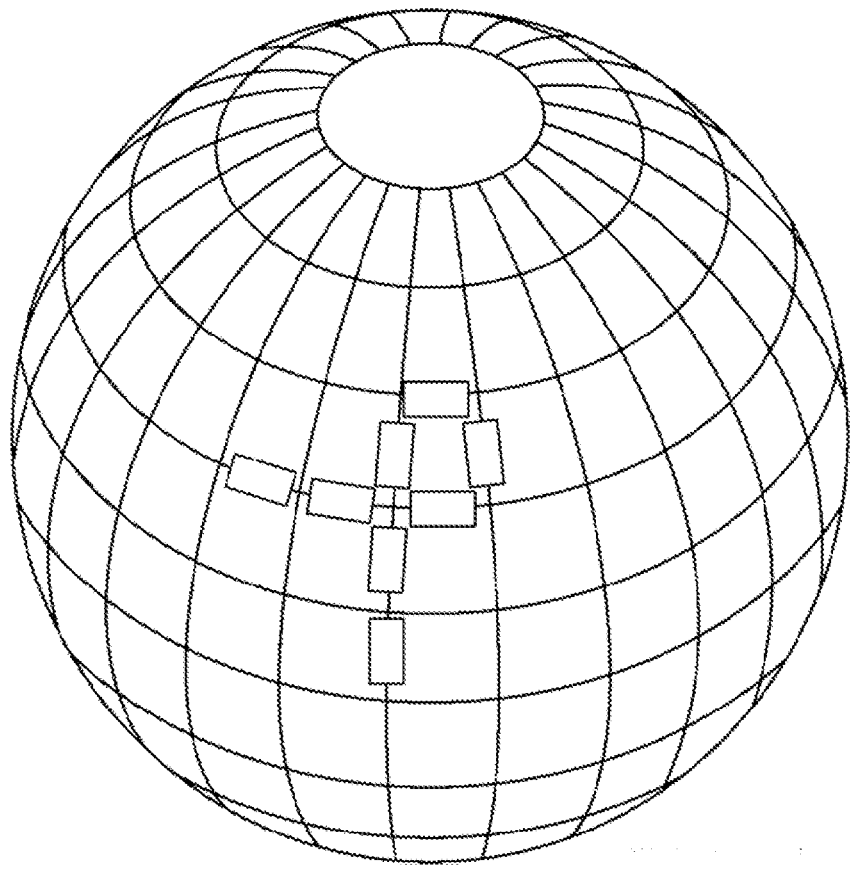
FIG. 2 is a schematic diagram illustrating a motor arrangement in a motor matrix control method according to an embodiment of the present invention.

In an embodiment of the present invention, the linear motors are transversely-vibrating linear motors, and each linear motor has identical initial phase and resonance frequency; the arranging several linear motors according to a 3D spherical model to form a linear motor matrix comprises: placing linear motors on the 3D spherical model in the directions of meridian and parallel as shown in FIG. 2 so that all linear motors in the direction of meridian are arranged in the direction of meridian, all linear motors in the direction of parallel are arranged in the direction of parallel, and all linear motor devices in the same direction are oriented in the same direction.

Motor vibration interference and offset may be prevented in a way that the motor are arranged in the same direction and devices are oriented in the same direction. Meanwhile, all motors have the same initial phase and resonance frequency, motors will not cause offset action of forces during synergic movement of motors, ensure the vibration effect to allow for stable and effective synchronization between the vibration effect and the sound signal, improve uniformity of the virtual reality experience and enhance the user's tactile experience.

In an embodiment of the present invention, obtained azimuth features in the 3D audio signal is represented by using Euler angle in Euler's Law, including a nutation angle $\theta$, a precession angle $\psi$ and a rotation angle $\varphi$, the azimuth information represented by the Euler angle may be obtained by using 3D virtual surround sound algorithm, and input into the 3D motor matrix to drive the motors to achieve unification of sound information and vibration.

Figure 3:
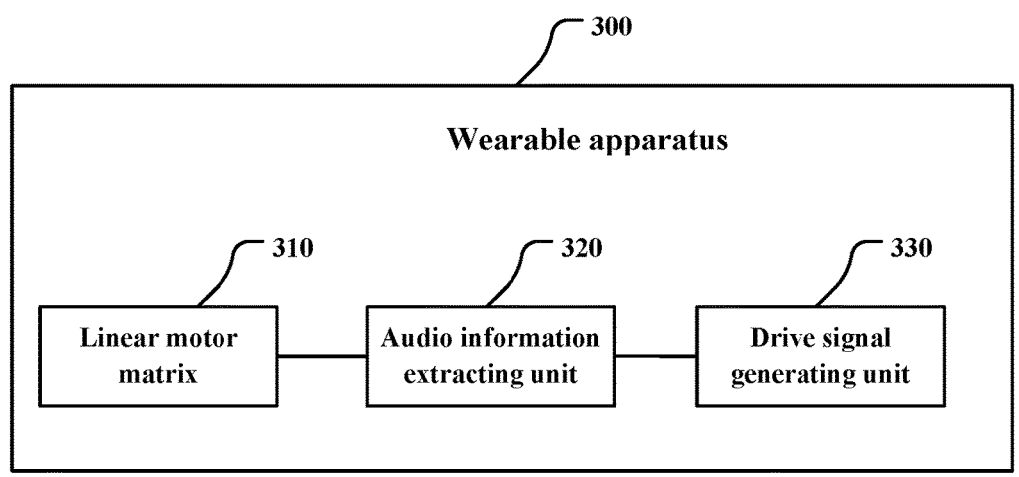
FIG. 3 is a block diagram illustrating a wearable apparatus according to another embodiment of the present invention.

FIG. 3 illustrates a block diagram of a wearable apparatus according to another embodiment of the present invention. The wearable apparatus 300 comprises:

a linear motor matrix 310 consisting of several linear motors arranged on a 3D spherical model, azimuth of each linear motor of the linear motor matrix 310 being determined based on the 3D spherical model.

An audio information extracting unit 320 configured to perform information extraction for the received 3D audio signal, and obtain azimuth, frequency and amplitude information of the 3D audio signal reaching a central position of the 3D spherical model.

A drive signal generating unit 330 configured to generate a motor drive signal according to the azimuth, frequency and amplitude information of the 3D audio signal reaching the central position of the 3D spherical model, and drive a linear motor in the linear motor matrix 310 within a certain scope away from the azimuth of the 3D audio signal to vibrate.

Wherein the wearable apparatus may comprise any head-worn and hand-held devices that are in contact with human skin, such as virtual head-worn device, video glasses, motorcycle helmet, joystick, and powered ball toy.

In an embodiment of the present invention, the drive signal generating unit 330 is specifically configured in a way that in an ascending order of a distance from the azimuth of the 3D audio signal, a voltage value of the drive signal gradually attenuates, and a frequency of the drive signal does not change until the voltage value of the drive signal is smaller than or equal to a minimum drive signal voltage value driving the linear motor to vibrate.

In an embodiment of the present invention, the drive signal generating unit 330 is further configured to determine an attenuation rate of the voltage value of the drive signal according to the frequency information of the 3D audio signal.

In an embodiment of the present invention, the linear motors in the linear motor matrix 310 are transversely-vibrating linear motors, and each linear motor has the identical initial phase and resonance frequency; the linear motors are placed on the 3D spherical model in the directions of meridian and parallel so that all linear motors in the direction of meridian are arranged in the direction of meridian, and all linear motors in the direction of parallel are arranged in the direction of parallel.

In an embodiment of the present invention, the azimuth of the 3D audio signal is represented by using Euler angle in Euler's Law, including a nutation angle $\theta$, a precession angle $\psi$ and a rotation angle $\varphi$.

Noticeably, embodiments of the wearable apparatus shown in FIG. 3 correspond to the embodiments of the method shown in FIG. 1 which have already been described in detail, and are not detailed here.

By arranging several linear motors based on a 3D spherical model to form a linear motor matrix, performing information extraction for received 3D audio signal, obtaining azimuth, frequency and amplitude information of the 3D audio signal reaching a central position of the 3D spherical model, and generating a drive signal for driving the motor matrix according to the 3D audio signal to drive a motor at the corresponding azimuth in the motor matrix to vibrate according to the amplitude and frequency information of the 3D audio signal, technical solutions of the present invention input components of 3D sound into the 3D matrix motors for tactile feedback, control a linear motor at a corresponding position according to the characteristics information of the 3D audio signal to vibrate according to corresponding amplitude and frequency, and tactilely increase real sensory experience so that seamless matching of the 3D sound and 3D tactile feedback is achieved in respect of azimuth, frequency and intensity, and immersed type experience of virtual reality is enabled better. By using linear motors having identical initial phase and resonance frequency and arranging the linear motors with identical orientation in the same direction, the solution ensures the motor vibration effect, improves tactile experience effect, and is adapted for various wearable apparatuses and applied to extensive scenarios.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:
1. A motor matrix control method, wherein the method comprises:
arranging several linear motors based on a 3D spherical model to form a linear motor matrix, and determining an azimuth of each linear motor of the linear motor matrix on the 3D spherical model;

performing information extraction for received 3D audio signal, and obtaining azimuth, frequency and amplitude information of the 3D audio signal reaching a central position of the 3D spherical model;

generating a motor drive signal according to the azimuth, frequency and amplitude information of the 3D audio signal reaching a central position of the 3D spherical model, and driving a linear motor in the linear motor matrix within a certain scope away from the azimuth of the 3D audio signal to vibrate.

2. The motor matrix control method according to claim 1, wherein the driving a linear motor in the linear motor matrix within a certain scope away from the azimuth of the 3D audio signal to vibrate comprises:

in an ascending order of a distance from the azimuth of the 3D audio signal, a voltage value of the drive signal gradually attenuates, and a frequency of the drive signal does not change until the voltage value of the drive signal is smaller than or equal to a minimum drive signal voltage value driving the linear motor to vibrate.

3. The motor matrix control method according to claim 2, wherein an attenuation rate of the voltage value of the drive signal is determined according to the frequency information of the 3D audio signal.

4. The motor matrix control method according to claim 1, wherein the linear motors are transversely-vibrating linear motors, and each linear motor has identical initial phase and resonance frequency;

the arranging several linear motors according to the 3D spherical model to form a linear motor matrix comprises:

placing the linear motors on the 3D spherical model in the directions of meridian and parallel so that all linear motors in the direction of meridian are arranged in the direction of meridian, all linear motors in the direction of parallel are arranged in the direction of parallel, and all linear motor devices in the same direction are oriented in the same direction.

5. The motor matrix control method according to claim 1, wherein the azimuth of the 3D audio signal is represented by using Euler angle in Euler's Law, including a nutation angle $\theta$, a precession angle $\psi$ and a rotation angle $\varphi$.

6. A wearable apparatus, wherein the apparatus comprises:

a linear motor matrix consisting of several linear motors arranged on a 3D spherical model, azimuth of each linear motor of the linear motor matrix being determined based on the 3D spherical model;

an audio information extracting unit configured to perform information extraction for the received 3D audio signal, and obtain azimuth, frequency and amplitude information of the 3D audio signal reaching a central position of the 3D spherical model;

a drive signal generating unit configured to generate a motor drive signal according to the azimuth, frequency and amplitude information of the 3D audio signal reaching the central position of the 3D spherical model, and drive a linear motor in the linear motor matrix within a certain scope away from the azimuth of the 3D audio signal to vibrate.

7. The wearable apparatus according to claim 6, wherein the drive signal generating unit is specifically configured in a way that in an ascending order of a distance from the azimuth of the 3D audio signal, a voltage value of the drive signal gradually attenuates, and a frequency of the drive signal does not change until the voltage value of the drive signal is smaller than or equal to a minimum drive signal voltage value driving the linear motor to vibrate.

8. The wearable apparatus according to claim 7, wherein the drive signal generating unit is further configured to determine an attenuation rate of the voltage value of the drive signal according to the frequency information of the 3D audio signal.

9. The wearable apparatus according to claim 6, wherein the linear motors of the linear motor matrix are transversely-vibrating linear motors, and each linear motor has identical initial phase and resonance frequency;

the linear motors are placed on the 3D spherical model in the directions of meridian and parallel so that all linear motors in the direction of meridian are arranged in the direction of meridian, all linear motors in the direction of parallel are arranged in the direction of parallel, and all linear motor devices in the same direction are oriented in the same direction.

10. The wearable apparatus according to claim 6, wherein the azimuth of the 3D audio signal is represented by using Euler angle in Euler's Law, including a nutation angle $\theta$, a precession angle $\psi$ and a rotation angle $\varphi$.

* * * * *